Figure 1:
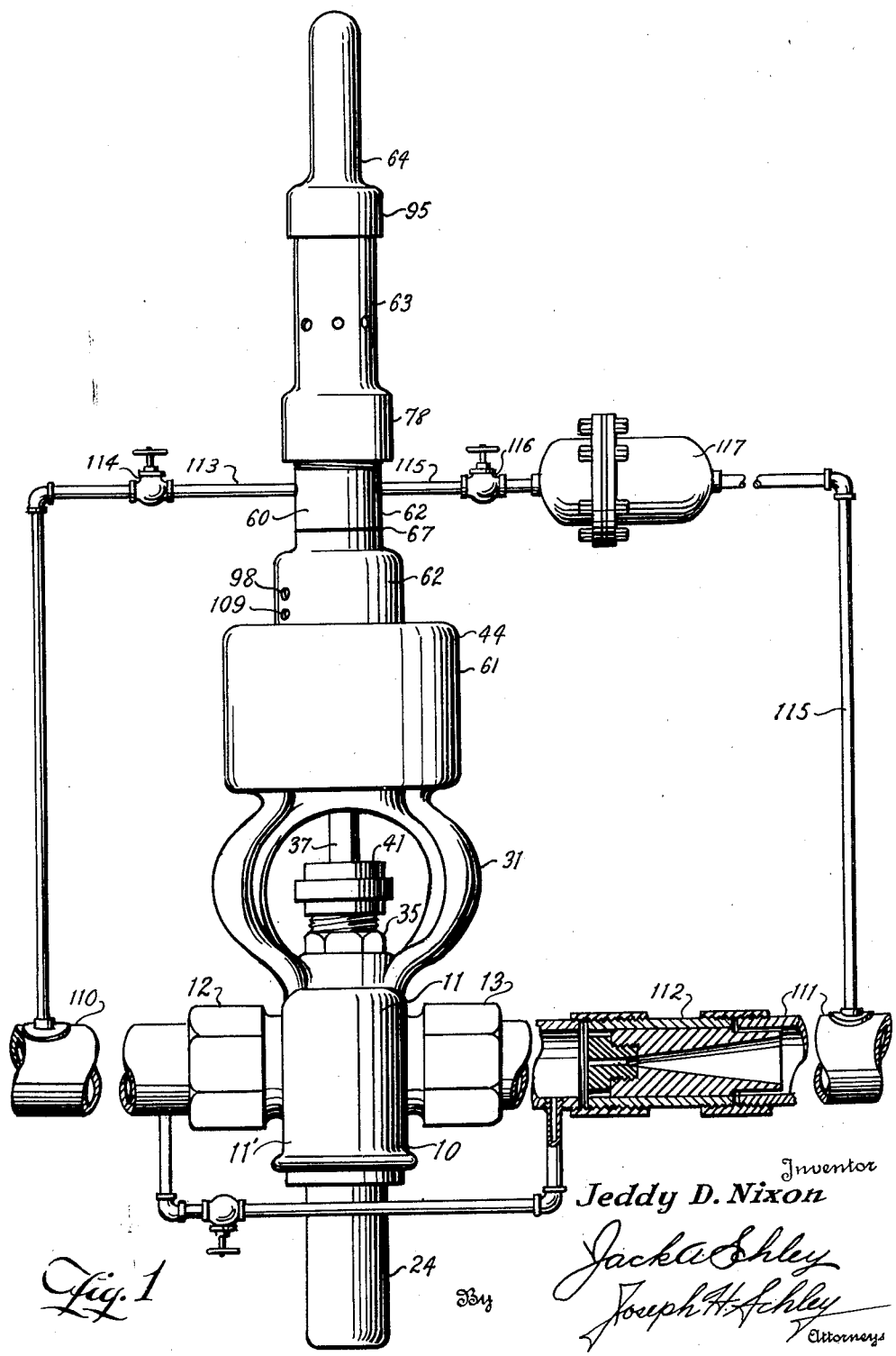

April 18, 1950 J. D. NIXON 2,504,720
FLUID PRESSURE REGULATOR
Filed Aug. 17, 1945 4 Sheets-Sheet 2

Inventor
Jeddy D. Nixon
By Jack Ashley
Joseph H. Ashley
Attorneys

April 18, 1950　　　　J. D. NIXON　　　　2,504,720
FLUID PRESSURE REGULATOR

Filed Aug. 17, 1945　　　　　　　　　　　　4 Sheets-Sheet 3

Inventor
Jeddy D. Nixon
By Jack Ashley
Joseph H. Ashley
Attorneys

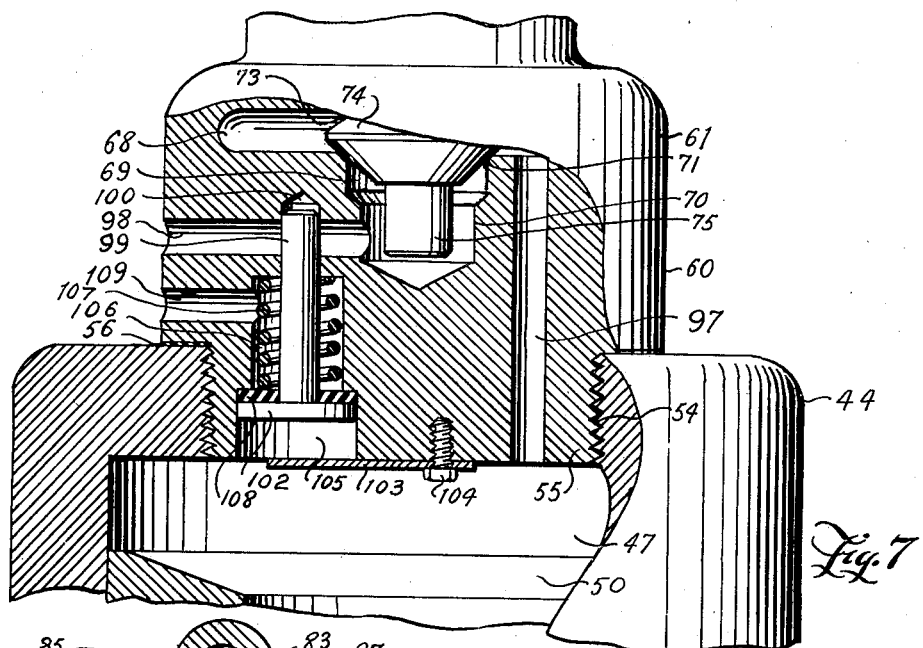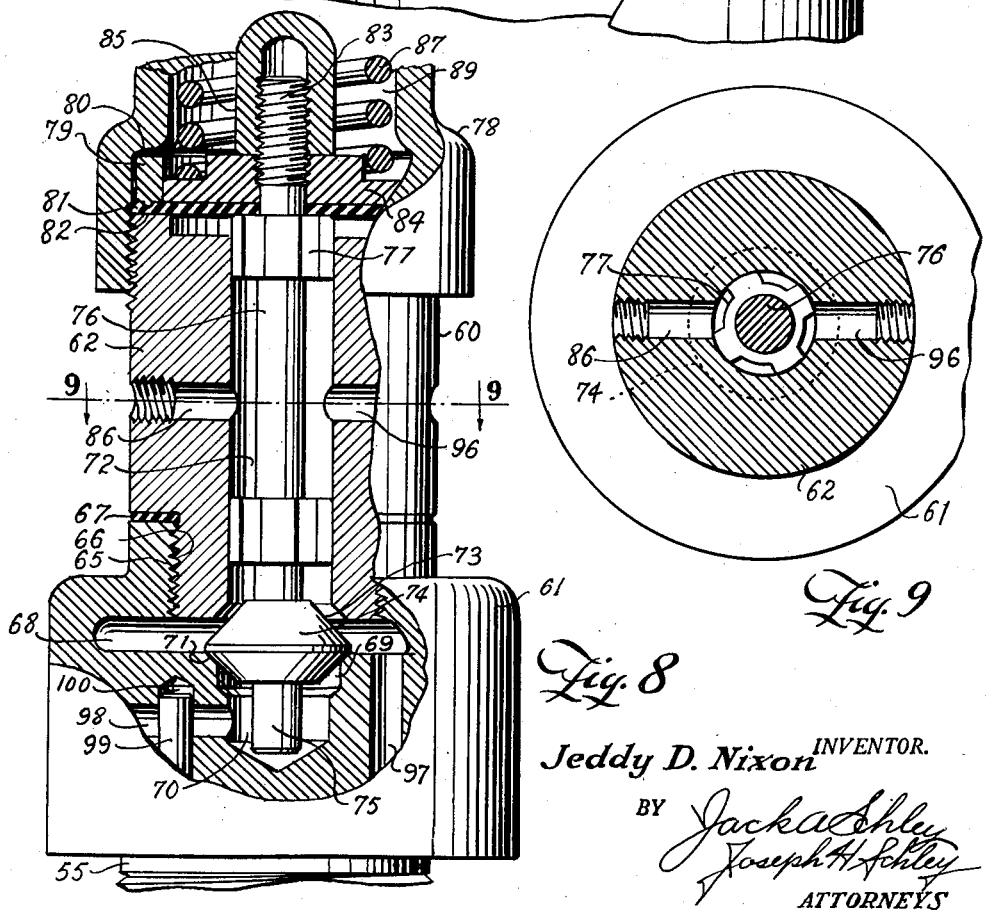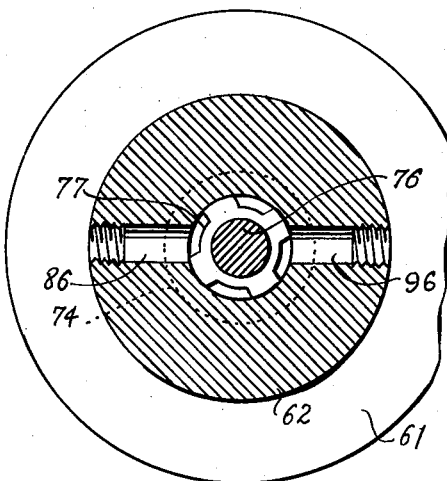

Patented Apr. 18, 1950

2,504,720

UNITED STATES PATENT OFFICE 2,504,720

FLUID PRESSURE REGULATOR

Jeddy D. Nixon, New Braunfels, Tex., assignor of one-half to Wilson Supply Company, Houston, Tex., a corporation of Texas Application August 17, 1945, Serial No. 610,899

7 Claims. (Cl. 50—23)

This invention relates to new and useful improvements in fluid pressure regulators.

One object of the invention is to provide an improved fluid pressure regulator wherein the elements are combined in a single structure instead of dual structures, as for instance as in my Letters Patent No. 2,323,838, and No. 2,323,839, both issued July 6, 1943, thus making for a reduction in the number of parts involved, general simplicity, lower manufacturing costs and a decrease in the maintenance required.

A particular object of the invention is to provide an improved fluid pressure regulator having simple means for regulating the downstream pressure from the regulator and also means for maintaining a predetermined pressure differential, together with a flow control valve automatically closed and opened at the top and bottom of said differential range.

A further object of the invention is to provide an improved fluid pressure regulator having means for manually establishing a maximum downstream fluid pressure to which the regulator responds to shut off the flow when such maximum pressure is reached and means for automatically opening said valve when a minimum downstream pressure is reached, acting over a pressure differential range which is determined by the ratios between the seats of a pilot valve.

Another object of the invention is to provide a regulator having a pilot valve for controlling the supply of pressure fluid to a flow valve operator; which pilot valve is arranged to operate over a related pressure differential range to open and supply pressure fluid to the flow valve operator to open the flow valve when a minimum downstream pressure across the regulator is automatically reached and to close and cut off the supply of pressure fluid to cause said flow valve to close when a selected maximum pressure across the regulator is reached, whereby said pilot valve remains fully open or fully closed during such differential range, according to whether the differential pressure is building up and/or is decreasing.

Still another object of the invention is to provide an improved regulator having a single means of adjustment to vary the maximum pressure at which the control valve closes and means for automatically maintaining a related differential pressure range to open the flow valve at a lower pressure, which range is automatically established by the adjustment of the high pressure.

An important object of the invention is to provide an improved flow valve for a regulator including a valve ball and a piston for unseating said ball, whereby an increased opening travel of the ball is obtained which carries said ball out of the direct flow path of the fluid passing through the valve which reduces the cutting action incidental to the flowing medium, as well as tending to keep the valve seat clean and producing more efficient seating.

Another object of the invention is to provide an improved ball type flow valve for a regulator including a removable seat and simple means for holding said seat in place, whereby the seat may be readily removed; together with a novel ball carrier and retainer, whereby the parts are readily accessible and simple and convenient to install and remove and also whereby, the ball, seat and stem may be removed without removing the valve from its connections in the flow line.

A further object of the invention is to provide an improved flow valve for a pressure regulator including a valve ball and having a cylinder provided with a piston for unseating the ball and a seal ring engaged by the piston at one end of the stroke to seal off the cylinder against fluid leaks as well as to vent the cylinder to the atmosphere in advance of said piston stroke, together with a removable piston rod or valve stem which may be withdrawn from both the piston and the valve without disconnecting or dismantling the valve or cylinder.

A construction designed to carry out the invention will be hereinafter described together with other features of the invention.

Figures 2, 3:
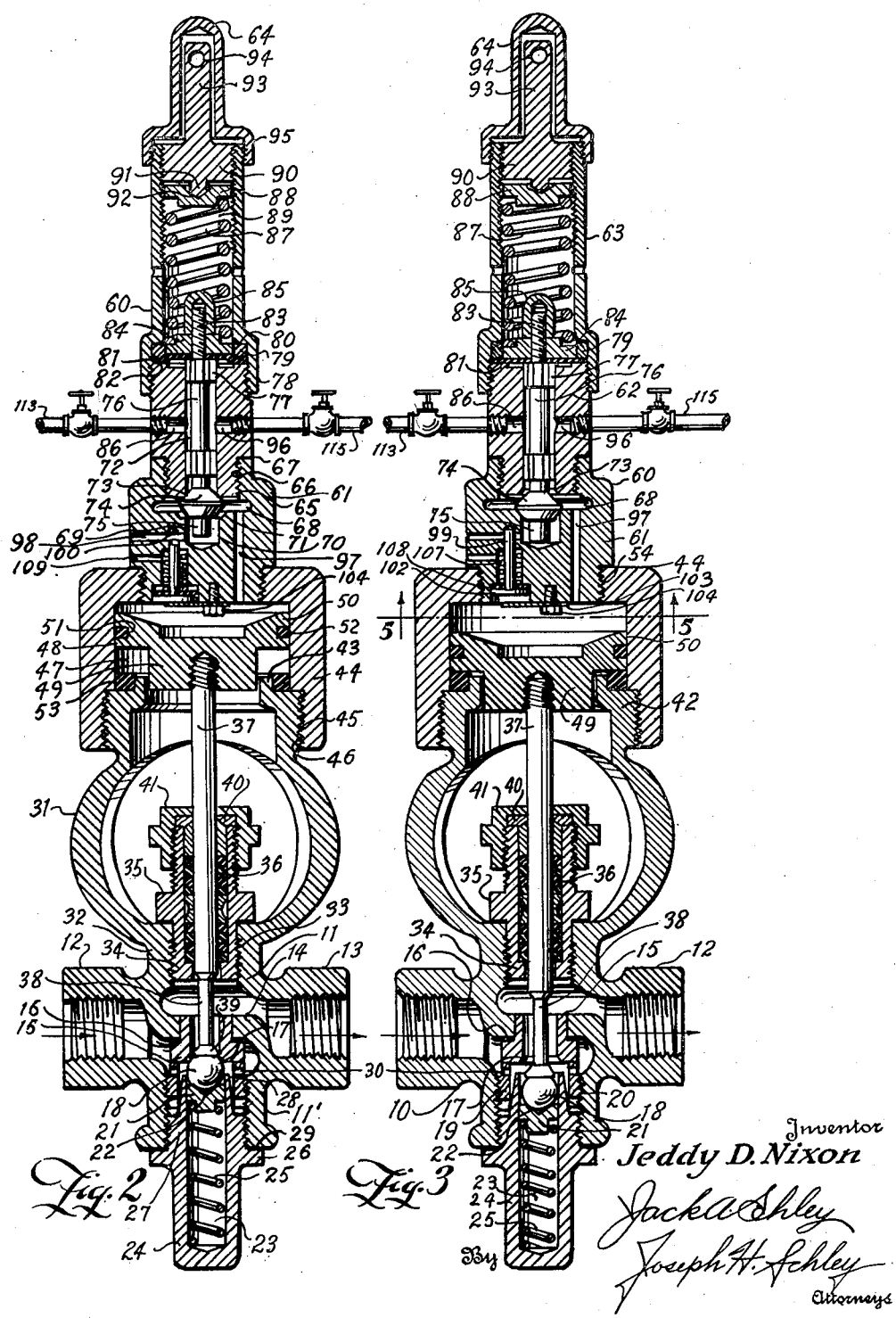
Figure 4:
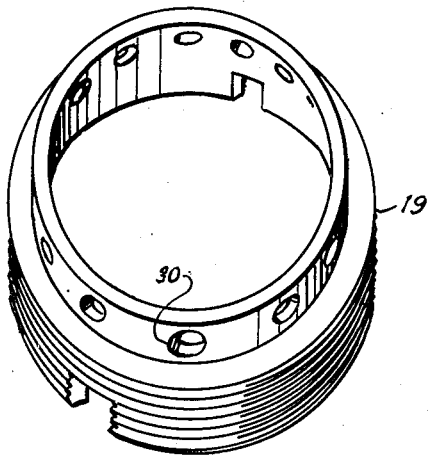
Figure 6:
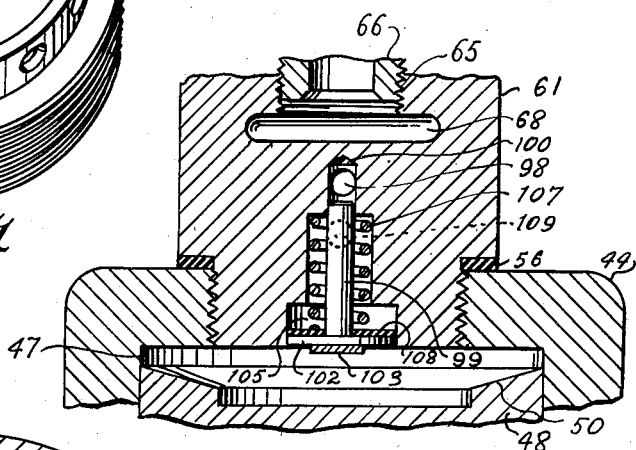
Figure 5:
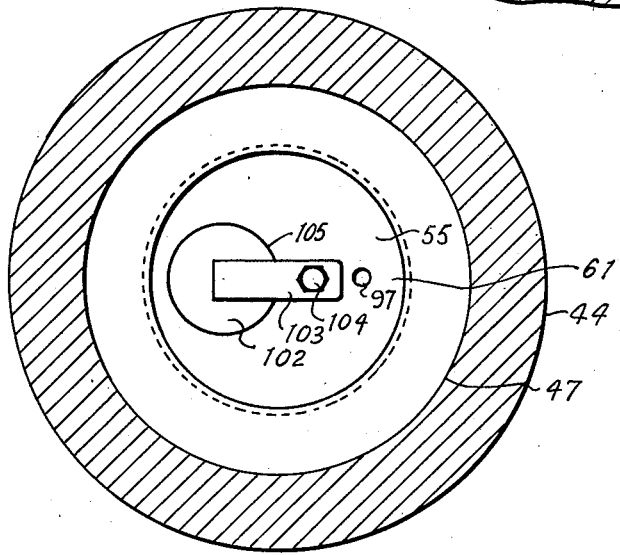

The invention will be more readily understood from a reading of the following specification and by reference to the accompanying drawings, wherein an example of the invention is shown, and wherein:

Fig. 1 is a view partly in elevation and partly in section of a fluid flow regulating system involving a regulator constructed in accordance with the invention, Fig. 2 is a vertical, sectional view of the regulator in its closed position, Fig. 3 is a similar view of the regulator in its open position, Fig. 4 is an isometrical view of the control valve retaining collar, Fig. 5 is a horizontal cross-sectional view taken on the line 5—5 of Fig. 3 looking in the direction of the arrows, Fig. 6 is a transverse partial sectional view taken on the line 6—6 of Fig. 2, Fig. 7 is an enlarged partial sectional view of the pilot valve, and Fig. 8 is an enlarged partial sectional view of the flow valve.

Fig. 9 is a sectional view taken on line 9—9 of Fig. 8.

In the drawings, the numeral 10 designates a line flow valve, the T-shaped casing 11 of which is provided with the usual internally screw-threaded inlet shank 12 and outlet shank 13. The casing has the usual sinuous valve-seat partition 14. This partition is bored out to receive an inverted flanged valve-seat bushing 15 which has a snug fit therein and carries a packing gasket 16 between its flange and the underside of said partition. The bushing has an annular seat 17 for receiving a valve ball 18. For removably supporting the bushing in place, an externally screw-threaded retaining collar 19 is screwed up into threads 20 provided in the bore of the central depending leg 11' of the valve case. When the seat 17 becomes worn or battered so that it cannot be further ground, the bushing may be removed and replaced.

For yieldably supporting the ball 18 in engagement with the seat 17, an annular ball follower 21 is provided. In order to prevent the ball from freezing or sticking in the follower, a conical sump 22 is formed in the top of said follower for receiving said ball. The follower has a free sliding fit in the cylindrical bore 23 of a generally cylindrical plug 24. For resiliently supporting the follower a light-weight coiled spring 25 confined in the bore surrounds at its upper end, the reduced lower end of the follower. The bore 23 is made comparatively long so that a spring of sufficient length may be used and has its lower end closed, thus providing a trap for foreign matter settling in the valve case.

The plug has at its medial portion a surrounding flange 26 and above this flange an externally screw-threaded head 27, screwed into the threads 20. An upstanding annular sleeve 28 formed integral with the head, freely telescopes the retaining collar 19, and may be reduced toward its upper end to provide ample clearance in screwing the plug into position. For sealing the plug a gasket 29 carried by the flange 26 is compressed against the bottom of the leg 11'. Fluid entering by way of the inlet shank 12 flows into the case 11 and under the partition 15, the retaining collar 19 having ports 30 for this purpose.

It will be observed that a greater cross-sectional area of the ball 18 is exposed below its seat 17, then is enclosed by said seat, therefore, the fluid entering the valve case, being at least under a flowing pressure, will aid the spring 25 in seating the valve ball and closing the valve. If fluid pressures across the ball are equalized, the spring will seat the ball. The valve ball may be readily replaced and being free to revolve will tend to keep seat 17 clean; also provides a more efficient closure than the ordinary annular valve head. A ball type of valve is also advantageous in this particular apparatus, as will be hereinafter pointed out.

A globe-type spider or cage 31 is united at its bottom with the top of the valve case by an integral annular neck 32 which is provided with an internally screw-threaded bore 33 receiving the lower externally screw-threaded end of a cylindrical stuffing box 34. The box is formed with a medial wrench collar 35, whereby the box may be screwed down into the bore 33. Suitable packing rings 36 are disposed in the box and surround a piston rod 37, having its lower end reduced to form a valve stem 38. A cup 39 formed integral with the lower end of the valve stem engages on top of the ball 18. The packing rings are compressed by the usual gland 40 and compression cap nut 41.

The cage 31 is formed at its top with an integral annulus 42 provided with an internal, upstanding annular flange 43. An annular piston cylinder 44 has an internally screw-threaded bore 45 at its bottom adapted to be screwed onto external screw-threads 46 on the outer periphery of the annulus. The piston cylinder may be annular or hexagonal in shape. The bore 47 of the cylinder is of relatively short height because the piston head 48 which reciprocates vertically therein, has a comparatively short stroke. This piston head includes a central annular body 49 and an outwardly directed annular flange 50 having a snug sliding fit in the cylinder. The upper end of the piston rod 37 is screwed into the center of the body and said body is small enough to depend into the flange 43 and provide an annular space therebetween.

The top of the piston head 48 is dished and the head flange 50 is provided with a ring groove 51 receiving an ordinary split piston ring 52 which rides the wall of the cylinder bore 47. A suitable elastic or yieldable stop ring 53 is seated on top of the annulus 42 in the annular space between the flange 43 and the cylinder bore 47. This stop ring projects above the flange and acts to limit the downward stroke of the piston head, as well as to cushion it. When the flange 50 of the head engages the ring, a fluid-tight seal is formed and pressure fluid above the head, which may leak by the ring 52, cannot escape.

A regulating head 60 is mounted on the piston cylinder 44 and includes in general an annular valve block 61, a cylindrical shank 62 of a pilot valve, a cap sleeve 63 and a cap 64. The top of the piston cylinder 44 is provided with an internally screw-threaded central opening 54 and the valve block 61 has a reduced externally screw-threaded boss 55 at its bottom screwed into said opening and packed with a gasket 56. The block is reduced at its upper end and has an axial, internally screw-threaded bore 65 which receives a reduced, externally screw-threaded boss 66, formed on the lower end of the shank 62, packed by a gasket 67.

At the bottom of the bore 65 the block has an enlarged annular, but shallow, chamber 68 and the boss 66 terminates short of the bottom of said bore, thus providing a closure for the chamber. The bottom of the chamber has a short cylindrical bore 69 with a cylindrical sump 70 at its bottom. An annular beveled valve seat 71 is formed at the top of the bore 69. The shank 62 has an axial bore 72 extending therethrough and this bore has a beveled valve seat 73 at its bottom. It is pointed out that the lower valve seat 71 has a greater diameter than the upper valve seat 73, which is quite important in the operation hereinafter described.

A double frusto-conical valve head 74 operates in the chamber 68 between valve seats 71 and 73. The valve seat 71 being larger is engaged by the lower conical face of the valve head nearer its base than the line of engagement between the upper smaller valve seat 73 and the upper conical face of said head. The valve head has a very limited movement, such movement in actual practice being not greater than $\frac{1}{16}$ of an inch. A pilot pin 75 extends from the valve through the bore 69 and into the sump 70. A valve stem 76, integral with the head, extends therefrom upwardly through the bore 72 and has upper and lower guide wings 77 which slide snugly in said bore.

The upper end of the shank 62 is externally screw-threaded and receives the internally screw-threaded annular rim 78 of the cap sleeve 63. A hold-down ring 79 fitted in the rim is confined by an internal annular shoulder 80 and secures a diaphragm 81 against an upstanding annular boss 82 on top of the shank. This diaphragm is confined on the upper guide wings 77 and surrounds a screw-threaded stud 83 extending upwardly from the valve stem 76. A flanged washer 84 is screwed onto the stud against the upper side of the diaphragm. A cap nut 85 is screwed onto the stud and fastens the washer in place. When the diaphragm 81 is moved upwardly as shown in Fig. 2 the stem 76 is elevated and the upper conical face of the valve head 74 is engaged with the upper valve seat 73; thus pressure fluid which enters the bore 72 by way of an inlet port 86 and moves said diaphragm upwardly cannot escape downwardly into the chamber 68, but may do so when the diaphragm and valve are moved downwardly.

A coiled spring 87 confined in the cap sleeve 63 with its lower end resting on the flanged washer 84 and upper end engaging the under side of a flanged follower 88. The upper end of the cap sleeve is made with internal screw-threads 89 for receiving a screw-threaded compression plug 90. This plug has a depending axial pilot stud 91 loosely engaging in a sump 92 in the center of the top of the follower. For rotating the plug to vary the compression of the spring, a stem 93 extends axially from the plug up into the cap 64, and is provided with a transverse opening 94 for receiving a tool. The cap has an internally screw-threaded annular apron 95 at its bottom, whereby it is screwed onto the upper end of the cap sleeve.

When the valve head 74 is forced downward by the coiled spring 87 onto the seat 71, a pressure fluid entering the bore 72 of the shank 62 by way of the port 86 or through an opposite port 96, may pass down said bore, through the valve seat 73 and into the chamber 68 in the block 61. A vertical passage 97 leads from one side of said chamber down through the block and discharges the pressure fluid into the piston cylinder 44 on top of the piston head 48, whereby the latter is moved downwardly until its flange 50 comes to rest upon the sealing ring 53. When the piston head 48 is moved downwardly, its rod 37 is likewise moved, which causes the stem 38 to unseat the valve ball 18 and open the valve 10 to a line flow therethrough. It is obvious that unless the bore 69 and sump 70 of the block 61 had a vent, the valve 74 would not efficiently close on the seat 71 and therefore, a passage 98 leads laterally through the block 61 from the sump to the atmosphere.

To provide a snap-action unseating of the valve 74 from its seat 71, means is included for restricting the passage 98. Such means includes a plunger 99 movable vertically in a bore 100 intersecting said passage. The plunger has a flat circular head 102 at its lower end movable vertically in a cylindrical chamber 105 made in the bottom of the boss 55 and open to the cylinder bore 47. A flat bracket 103 secured by a stud screw 104 in the bottom of the said boss, supports said head. A counterbore 106 of larger diameter extends from the bore 100 down to the chamber 105. The head carries a packing disk 108 and a coiled spring 107 surrounds the plunger 99 between the top of the counterbore and the disk.

When pressure fluid is admitted to the cylinder bore 47, it will act upon the head 102 and force it upwardly, whereby the plunger 99 will be elevated and restrict the passage 98 and the packing disk 108 will engage the top of the chamber 105 and prevent the escape of fluid to the atmospheric vent 109. The purpose of the restricting means is to permit pressure fluid from the chamber 68 to enter the bore 69, when the valve head 74 initially moves upwardly from the seat 71 and build up sufficient pressure to complete the opening and upper seating of said valve head, with a snap action. The plunger 99 does not entirely close off the passage 98, so that when the valve head 74 is lifted from the seat 71, pressure fluid will bleed past the plunger and as soon as the pressure in the bore 47 reduces a small amount, the spring 107, which has been compressed by the upward movement of the head 102, will move the latter downwardly, thereby withdrawing the plunger and fully opening the passage 98 to release the pressure fluid to the atmosphere. The vent 109 is provided merely to prevent resistance to the upward travel of the head 102.

While it is believed the operation will be generally understood from the foregoing description, it will be further explained. The inlet shank 12 of the flow valve 10 is connected with a fluid supply or upstream pipe 110; while the outlet shank 13 is connected with an outlet or downstream pipe 111 in which an ordinary choke 112 is connected as is shown in Fig. 1. A small by-pass pipe 113, having a hand valve 114 connected therein, extends from the pipe 110 to the port 86. The flow valve 10 will be closed with its ball 18 in engagement with its seat 17 as is shown in Fig. 2. A second by-pass pipe 115 including a hand valve 116, extends from the port 96 to the downstream pipe 111 beyond the choke 112 and the valve will be closed. A suitable strainer or trap 117 may be connected in the pipe 115, if desired.

For the purposes of ilustration it will be assumed that fluid such as gas is supplied to the pipe 110 at 900 lbs. per sq. in. and it is desired to carry a regulated pressure on the downstream line of approximately 500 lbs. per sq. in. It is to be understood that the downstream pipe 111 may be comparatively short, as for instance 500 feet, or comparatively long, as for instance one mile or more. When used in oil fields, this pipe may feed gas for various purposes, such as to feed boilers, operate gas engines and for heating and various other uses. There will be a pressure drop during the flow of the gas down this line; also, the demand or load may vary considerably.

The purpose of the regulator is to automatically supply pressure fluid, such as gas, to the downstream line and to maintain therein a working pressure of approximately a predetermined value. In order to accomplish this result, it will be necessary to carry a higher pressure at the regulator than is actually used down the line so as to compensate the pressure drop along the line. It is pointed out that after the flow valve 10 is closed, a variable period of time may occur before the valve is opened. Once the downstream line pressure is built up and the valve 10 closed, the time elapsing before the line pressure drops sufficiently to open said valve, will depend entirely on the consumption of gas or the demand load and the amplitude of the pressure differential range. If such load is heavy, the pressure drop will be somewhat rapid, as for instance a few or more minutes; however, if the demand is low, the time elapse will be much longer, as for instance from thirty minutes to an hour.

As before pointed out, one purpose of the invention is to supply pressure fluid at a regulated pressure to maintain a working pressure in the downstream line adequate to meet all demands made thereon. Thus, if the maximum pressure is set at 500 lbs. per sq. in., and the minimum pressure reaches 470 lbs. per sq. in. and a differential range of 30 lbs. per sq. in., therefore, the regulator is readily responsive to the load demands. Once the valve 10 is opened to supply pressure fluid, the pressure in the downstream line will be built up at a rate in proportion to the upstream and downstream pressure ratio, allowance being made for demand on the downstream line during such period of time. However, if there should be constant demand after the flow valve 10 was opened, it might occur that a protracted period of time would elapse before the downstream pressure built up to a maximum and before the flow valve was closed. As an illustration, if one or more oil well gas lifts were being operated for a prorated time period, then the consumption of gas might be such as to hold the downstream pressure within the differential range, during which time the flow valve would remain open, which could be from a few minutes to an hour.

The valve 10 being open, it is obvious that when the downstream pressure across the regulator builds up to substantially 500 lbs. per sq. in., the valve 10 will be automatically closed. When the downstream pressure across the regulator reduces to substantially 470 lbs. per sq. in., the valve 10 will automatically open. Consequently, there will be no freezing, because the valve is either fully open or fully closed. The pressure drop in the downstream line results entirely from demand or load variations. The choke 112 is used primarily to restrict the downstream flow so that there will be no pressure reduction across the valve 10; the pressure of the fluid beyond the choke will be governed entirely by the load demand.

When it is desired to start the regulator, the valve 116 is left closed and the valve 114 is opened sufficiently to by-pass gas from the pipe 110 through the small pipe 113 to the bore 72 of the pilot valve 62. The spring 87 will have forced the diaphragm 81 and valve head 74 downwardly onto the seat 71, so the gas may flow into chamber 68 and thence by way of the passage 97 to the bore 47 above the piston and force said piston downwardly. The piston rod 37 will unseat the valve ball 18 and carry it down into the sleeve 28, where it will be out of the direct flow of the gas through the ports 30 and valve bushing 15 as is shown in Fig. 3. When gas is admitted to the bore 47, the plunger 99 will be displaced upwardly to restrict the passage 98.

The downstream line 111 will soon fill and at this time the valve 114 is closed and the valve 116 is opened which admits gas to the pilot valve 62 by way of the pipe 115 and port 95. Usually the hand valve 116 will only be partially opened because the pilot valve bore 72 is small and only a small volume of gas is necessary to operate the pilot; further, too great a volume might act too forceably. The plug 90 is adjusted to set the compression of the spring 87 to yield only when the gas pressure acting upwardly on the diaphragm 81, with the pilot valve head 74 down and open, reaches the desired high pressure, which according to the example hereinbefore given would be substantially 500 lbs. per sq. in. When the fluid pressure reaches its high limit, the diaphragm will be moved upwardly and the pilot valve head lifted from its seat 71 to its seat 73 as is shown in Fig. 2, whereby it is closed. When the valve lifts, the gas will bleed from the bore 47 by way of passage 97, chamber 68, bore 59, sump 70 and passage 98. Reduction of pressure in the bore 47 will cause withdrawal of plunger 99 and a quick release of the gas. This will permit the spring 25 to seat ball 18 and elevate the piston rod 38 and head 48 from the position shown in Fig. 3 to the closed position shown in Fig. 2, thus closing valve 10.

The valve 10 will remain closed until the pressure of the gas by-passing through the pipe 115 from the downstream pipe 111 drops to substantially 470 lbs. per sq. in. When this occurs, the compression of the spring 87 will overcome the effective pressure of the gas acting upwardly on the diaphragm and move the latter downwardly, thus unseating the valve head 74 from its seat 73, whereby gas will be supplied to the cylinder bore 47 to depress the piston head 80 and open the valve 10 as hereinbefore described. It will be observed that the valve seat 73 is considerably smaller than the valve seat 71 and thus the upper conical surface of the head has a much greater area than the lower conical surface and for this reason the valve opens downwardly with a snap action, because just as soon as the valve head is cracked open, the pressure fluid trapped in the bore 72, will act on the amplified exposure of the conical surface thereof.

It is pointed out that the valve head 74 has a very short travel, in most instances less than $\tfrac{1}{16}$ of an inch. The length of travel can be regulated by the thickness of the gasket 67 between the block 61 and shank 62, which thickness controls the distance between the seats 71 and 73. Owing to these differences in areas the head remains down until pressure builds up in the downstream line, it being noted that a greater valve surface area is exposed to the pressure when the valve is down than when it is up and in engagement with the seat 73. While the maximum pressure in the downstream line may be controlled and set by adjusting the spring 87, the differential range is regulated either by adjustment of the spring 87 or by the spacing of the valve seats 71 and 73, as will be hereinafter explained.

It may be assumed that the spacing illustrated in the drawings is arbitrarily set for a pressure differential of 30 lbs. per sq. in., for a regulated pressure of 500 lbs. per sq. in. The adjustment of the spring is made so that it will yield to the desired high pressure; but upon yielding to such high pressure and lifting the valve head 74 to shut off flow of gas to the piston head, it must so remain until the bottom of the pressure differential range is reached. When the valve 10 is closed and the supply of gas to the pipe 111 is cut off, the line pressure in said pipe drops, but the effective area of the valve head against seat 73 is such that the gas pressure applied against said diaphragm will restrain the spring until the bottom of the differential range is reached.

As above pointed out, when the valve head 74 is moved downwardly from its seat 73, a greater surface is exposed to the gas pressure, as will be obvious from observing Figs. 2 and 3. Thus, when the valve head is lowered, the effective area of the diaphragm 81 on which the pressure will act is reduced owing to the increase in the effective area of the valve head. Therefore, the diaphragm will not be moved upwardly until the pressure acting on this reduced effective area on the diaphragm becomes high enough to overcome the spring compression. It is pointed out that the ratio between the diameters of the seats 71 and 73 coupled with the compression of the spring 87 controls the pressure differential range. Thus, when the compression of said spring is altered to raise or lower the regulated fluid pressure, there will be a corresponding change in the pressure differential range in accordance with the ratio between said seat diameters; it being held in mind that these diameters control the effective areas of the conical valve head 74 when it is in engagement with said seats and the correlated effective areas of the diaphragm 81.

A differential pressure range of 30 lbs. per sq. in. at 500 lbs. per sq. in., has been arbitrarily selected for the purposes of illustration and the invention is not to be so limited. Using the foregoing illustration, it is obvious that if the regulated pressure is changed, there will be a corresponding change in the differential pressure range, although the amplitude of such range is controlled by the ratio of the valve seats 71 and 73 and such control is automatic. As an illustration, if the regulated pressure is raised to 600 lbs. per sq. in., it will be accomplished by increasing the compression of the spring 87 and thus while a higher fluid pressure would be required to open the pilot valve, the differential range would be proportionately increased, possibly 10 lbs. per sq. in.

By properly proportioning the valve seats 71 and 73 and the conical surfaces of the valve head 74, the pressure differential ranges at various high pressures may be reasonably calculated and sufficiently ascertained to assure satisfactory operation under ordinary conditions; however, requirements may arise where at a given high pressure it might be desirable to alter the pressure range. If it is desired to increase the pressure differential range, at the same high pressure, it can be accomplished by removing the shank 62 and replacing the gasket 67 with a thicker gasket, whereby the spacing between the seats 71 and 73 will be increased and the travel of the valve head 74 will be lengthened. Thus, when the valve head 74 moves downwardly to the seat 71, the compression of the spring 87 will decrease in proportion to the increased travel; consequently, the diaphragm and spring will respond to a lower bottom pressure and the range will be increased; although the same high pressure, as 500 lbs. per sq. in. is maintained.

The importance and advantage of the pilot valve elements is manifest. When the valve head 74 is in contact with seat 73, as is shown in Fig. 2, the area exposed to the pressure fluid is equal to the diameter of the bore 72 and consequently only an area of the diaphragm 81 equal in diameter thereto is uneffective. This gives the diaphragm a greater upward force, by which the spring 87 is restrained, than when the pilot valve is opened and an amplified area of said valve head is exposed to the pressure fluid whereby the upward force of the diaphragm is reduced. The diaphragm and the valve head must have the proper diameters and this is also true of the valve seats.

The control valve 10 and piston head 48 are also important and advantageous. The piston head must have sufficient area to unseat the valve ball 18, consistent with the upstream and regulated pressures. The displacement of the valve ball 18 out of the direct flow of the fluid, as well as the accessibility and removability of the associated elements is highly desirable. It is also important to have a pressure differential of sufficient range to provide the force required to open and close the pilot valve with a snap action.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A fluid pressure regulator including, a body having a closed chamber therein, a regulator head mounted on the body and having upper and lower valve seats therein, said head having an upper passage above the upper seat and a lower passage below the lower seat and a space between the seats, said head also having a passage between said space and the body chamber, an outlet passage in the head leading from the lower passage thereof, a dual faced valve between the seats alternately engageable therewith, fluid pressure responsive closure means for the outlet passage mounted in the head having an operating element exposed in the closed chamber, the upper passage of the head having a pressure fluid inlet, and a spring pressed diaphragm at the upper end of the upper passage connected with the valve.

2. A regulator including, a head having a passage therein, valve seats intermediate the ends of the head passage, a valve head movable between said seats, spring-pressed fluid responsive means attached to the head and having one side exposed to the pressure fluid in said passage, the head passage having fluid pressure inlets to the passage above the valve seats, an outlet to atmosphere below said seats, and fluid-pressure responsive closure means for partially shutting off fluid flow through the head outlet from the valve seats.

3. A regulator including, a cylinder having a closed chamber therein, a head having an upright fluid passage therein, valve seats intermediate the ends of the head passage, a valve head movable in the head passage between the seats, a flow passage in the head connecting the closed chamber with the fluid passage between the valve seats, a spring-pressed diaphragm at the upper end of the fluid passage connected with the valve head, the fluid passage having a fluid-pressure inlet between the valve seats and the diaphragm, an outlet passage in the head from the fluid passage below the seats, a shut-off member in the head for the outlet passage having a pressure fluid responsive element exposed to the pressure fluid in the cylinder chamber.

4. A fluid pressure regulator including, a body having a closed chamber therein, a regulator head mounted on the body and having a fluid passage therein, spaced upper and lower valve seats across the passage intermediate the ends thereof, a valve movable between said seats, the head having a duct between the valve seats and the chamber, an outlet passage leading from the fluid passage below the lower valve seat to the atmosphere, spring pressed closure means responsive to a fluid pressure in the chamber for partially closing the outlet passage, and a spring pressed diaphragm connected with the valve at the upper end of the fluid passage.

5. A fluid pressure regulator including, a body having a closed chamber therein, a regulator head mounted on the body and having a fluid passage communicating with the closed chamber and also having an outlet to the atmosphere, the head having a pressure fluid inlet to the passage, valve seats across said passage, a dual faced valve in the head movable between said seats for controlling the flow of pressure fluid to the body chamber and the flow of pressure fluid from the body chamber to the atmosphere, spring pressed means responsive to a pressure fluid in the body chamber controlling the escape of pressure fluid past the valve to the atmosphere from said chamber, and spring pressed means responsive to a pressure fluid in the fluid passage operating said valve.

6. A regulator as set forth in claim 5, wherein the regulator head has a second pressure fluid inlet for supplying pressure fluid to the passage to start the regulator.

7. A regulator as set forth in claim 5, wherein the valve seats are closely spaced and the valve has frusto-conical faces alternately engaging said seats.

JEDDY D. NIXON.

REFERENCES CITED

The following references are of record in the file of this patent:

UNITED STATES PATENTS

| Number | Name | Date |
|---|---|---|
| 436,858 | Kimball | Sept. 23, 1890 |
| 551,370 | Donnelly | Dec. 17, 1895 |
| 1,162,383 | Neal | Nov. 30, 1915 |
| 1,627,443 | Maier | May 3, 1927 |
| 2,171,613 | Vance | Sept. 5, 1939 |
| 2,323,838 | Nixon | July 6, 1943 |